(12) United States Patent
Peng et al.

(10) Patent No.: US 8,034,448 B2
(45) Date of Patent: Oct. 11, 2011

(54) FIBROUS COMPOSITES COMPRISING CARBON NANOTUBES AND SILICA

(75) Inventors: Huisheng Peng, Shanghai (CN);
Yuntian Theodore Zhu, Cary, NC (US);
Dean E. Peterson, Los Alamos, NM (US); Quanxi Jia, Los Alamos, NM (US)

(73) Assignee: Los Alamos National Security, LLC, Los Alamos, NM (US)

( * ) Notice: Subject to any disclaimer, the term of this patent is extended or adjusted under 35 U.S.C. 154(b) by 655 days.

(21) Appl. No.: 12/229,046

(22) Filed: Aug. 19, 2008

(65) Prior Publication Data
US 2010/0047569 A1 Feb. 25, 2010

(51) Int. Cl.
*D02G 3/00* (2006.01)

(52) U.S. Cl. ....... 428/370; 205/50; 423/324; 423/447.1; 977/742; 977/847; 977/748

(58) Field of Classification Search ................. 428/370, 428/376, 408; 423/447.1, 324, 447.2; 205/50; 977/742, 748, 847
See application file for complete search history.

(56) References Cited

U.S. PATENT DOCUMENTS

| | | | |
|---|---|---|---|
| 5,338,747 A * | 8/1994 | Robert et al. | 514/373 |
| 7,833,504 B2 * | 11/2010 | Wong et al. | 423/324 |
| 2009/0308753 A1 * | 12/2009 | Wong et al. | 205/50 |

* cited by examiner

*Primary Examiner* — N. Edwards
(74) *Attorney, Agent, or Firm* — Juliet A. Jones

(57) ABSTRACT

Fibrous composite comprising a plurality of carbon nanotubes; and a silica-containing moiety having one of the structures: $(SiO)_3Si-(CH_2)_n-NR_1R_2$ or $(SiO)_3Si-(CH_2)_n-NCO$; where n is from 1 to 6, and $R_1$ and $R_2$ are each independently H, $CH_3$, or $C_2H_5$.

20 Claims, 3 Drawing Sheets

FIBROUS COMPOSITES COMPRISING CARBON NANOTUBES AND SILICA

STATEMENT OF FEDERAL RIGHTS

The United States government has rights in this invention pursuant to Contract No. DE-AC52-06NA25396 between the United States Department of Energy and Los Alamos National Security, LLC for the operation of Los Alamos National Laboratory.

FIELD OF THE INVENTION

The present invention relates to fibrous composites comprising carbon nanotubes and a silica-containing compound, and to methods of making thereof.

BACKGROUND OF THE INVENTION

Carbon nanotubes (CNTs) are among the strongest materials ever discovered, having a tensile strength of up to 100 GPa. In order to use CNTs in practical applications, for example to weave into a cloth, it is necessary to assemble individual CNTs into macroscopic fibers. Interestingly, however, the tensile strength of CNT fibers is much lower than that of individual CNTs (e.g., less than 3.3 GPa). There exists a need, therefore, to produce CNT fibers which have increased tensile strength, and thus a wider range of practical applications.

CNT/silica composites have been extensively investigated, as silica provides stability in harsh environments, such as high temperature and strongly acidic or basic conditions, and ease of fabrication. CNT/silica composites have been produced which have a variety of morphologies, including films synthesized by solution casting, powders produced under hot pressure, xerogels produced by sol-gel technique, and nanocomposite films or powders resulting from covalent bonding between CNTs and silica. One of the main challenges for these materials is the random dispersion of CNTs in the resulting composites, which leads to much reduced mechanical strength and electrical properties. For example, CNT/silica composites with up to 30 vol. % of CNTs produced under hot pressure exhibit a tensile strength of only 85 MPa (two orders of magnitude smaller than CNT fibers). Therefore, despite the advantages of chemical stability provided by silica, it has not been apparent that silica can be used in combination with CNTs to increase mechanical strength.

SUMMARY OF THE INVENTION

The present invention provides composite CNT/silica fibers in which CNTs are highly aligned. These composite fibers exhibit unexpected and greatly improved mechanical properties and electrical conductivities, in comparison to CNT/silica films, powders or xerogels. The CNT/silica fibers have high tensile strength due to the formation of cross-linked robust and strong silica networks. In addition, they have good stability for use in harsh environments such as high temperatures and extreme pH ranges.

The following describe some non-limiting embodiments of the present invention.

According to one embodiment, a fibrous composite is provided comprising a plurality of carbon nanotubes; and a silica-containing moiety having one of the structures:
  i. $(SiO)_3Si—(CH_2)_n—NR_1R_2$; or
  ii. $(SiO)_3Si—(CH_2)_n—NCO$;
where n is from 1 to 6, and $R_1$ and $R_2$ are each independently H, $CH_3$, or $C_2H_5$.

According to another embodiment, a fibrous composite is provided comprising a plurality of carbon nanotubes; and a silica-containing compound having the structure $(SiO)_3Si—(CH_2)_n—NH_2$.

According to yet another embodiment, a fibrous composite is provided comprising a plurality of carbon nanotubes; and a silica-containing compound having the structure $(SiO)_3Si—(CH_2)_n—NCO$.

According to yet another embodiment, a method of producing fibrous composites is provided, comprising providing a plurality of carbon nanotubes; providing a solution comprising a solvent and a silica-containing compound having one of the structures: i. $(CH_3(CH_2)_nO)_3Si—(CH_2)_m—NR_1R_2$, where n is 0, 1, 2 or 3; m is from 1 to 6, and $R_1$ and $R_2$ are each independently H, $CH_3$, or $C_2H_5$; or ii. $(CH_3(CH_2)_nO)_3Si—(CH_2)_m—NCO$, where n is 0, 1, 2 or 3; and m is from 1 to 6; placing the carbon nanotubes in contact with the solution to form a fibrous composite; and substantially evaporating the solvent from the composite.

Some additional non-limiting embodiments include:

A method of producing a fibrous composite is provided, comprising:
 a. providing a plurality of carbon nanotubes;
 b. providing a silica-containing moiety having one of the structures:
  i. $(CH_3(CH_2)_nO)_3Si—(CH_2)_m—NR_1R_2$; or
  ii. $(CH_3(CH_2)_nO)_3Si—(CH_2)_m—NCO$, where n is 0, 1, 2 or 3; m is from 1 to 6, and $R_1$ and $R_2$ are each independently H, $CH_3$, or $C_2H_5$;
 c. spinning the carbon nanotubes into a fiber;
 d. placing the carbon nanotubes in contact with the solution to form the fibrous composite; and
 e. substantially evaporating the solvent from the composite.

The aforementioned method, wherein the fibrous composite is a semiconductor.

The aforementioned method, wherein the carbon nanotubes are made from a starting material comprising methane, ethylene, propylene, butylene, ethanol or combinations thereof.

The aforementioned method, wherein the starting material for the carbon nanotubes comprises ethylene.

The aforementioned method, wherein n is 1.

The aforementioned method, wherein m is 3.

The aforementioned method, wherein n is 1 and m is 3.

The aforementioned method, wherein $R_1$ and $R_2$ are each H.

The aforementioned method, wherein the fibrous composite has an average diameter of from about 5 μm to about 20 μm.

The aforementioned method, wherein the fibrous composite has a tensile strength of at least 0.3 GPa.

The aforementioned method, wherein the fibrous composite has a tensile strength of from about 0.3 GPa to about 0.5 GPa.

A method of producing a fibrous composite is provided, comprising:
 a. providing a plurality of carbon nanotubes;
 b. providing a silica-containing moiety having the structure:
  $(SiO)_3Si—(CH_2)_n—NR_1R_2$;
  where n is 0, 1, 2 or 3; m is from 1 to 6, and $R_1$ and $R_2$ are each independently H, $CH_3$, or $C_2H_5$;
 c. spinning the carbon nanotubes into a fiber;
 d. carboxylating the carbon nanotubes; and e. placing the carbon nanotubes in contact with the solution to form the fibrous composite; and f. substantially evaporating the solvent from the composite.

The aforementioned method further comprising the step of carboxylating the carbon nanotubes, wherein the fibrous composite is a semiconductor.

The aforementioned method further comprising the step of carboxylating the carbon nanotubes, wherein the starting material for the carbon nanotubes is ethylene.

The aforementioned method, wherein n is 1.

The aforementioned method, wherein m is 3.

The aforementioned method, wherein n is 1 and m is 3.

The aforementioned method, wherein $R_1$ and $R_2$ are each H.

The aforementioned method, wherein the fibrous composite has an average diameter of from about 5 μm to about 20 μm.

The aforementioned method, wherein the fibrous composite has a tensile strength of at least 0.3 GPa.

The aforementioned method, wherein the fibrous composite has a tensile strength of from about 0.3 GPa to about 5.0 GPa.

BRIEF DESCRIPTION OF THE DRAWINGS

FIG. 3(a) represents data obtained from a non-modified CNT fiber; FIG. 3(b) from a fiber produced by the casting method of FIG. 1 using CNTs made from an S1 precursor; FIG. 3(c) from a fiber produced by the casting method of FIG. 1 using CNTs made from an S2 precursor; and FIG. 3(d) from the "chemical deposition" method of FIG. 2 using CNTs made from an S2 precursor. S1 and S2 are $(CH_3CH_2O)_3Si—(CH_2)_3—NCO$ and $(CH_3CH_2O)_3Si—(CH_2)_3—NH_2$, respectively.

DETAILED DESCRIPTION OF THE INVENTION

In all embodiments of the present invention, all percentages are by weight of the total composition, unless specifically stated otherwise. All ratios are weight ratios, unless specifically stated otherwise. All ranges are inclusive and combinable. "Room temperature" is understood herein to mean 25° C., or 298 K. All numerical amounts are understood to be modified by the word "about" unless otherwise specifically indicated. All documents cited in the Detailed Description of the Invention are, in relevant part, incorporated herein by reference; the citation of any document is not to be construed as an admission that it is prior art with respect to the present invention. To the extent that any meaning or definition of a term in this document conflicts with any meaning or definition of the same term in a document incorporated by reference, the meaning or definition assigned to that term in this document shall govern.

"Fibrous composite," as used herein, is understood to mean a carbon nanotube (CNT), produced by conventional means, which is modified to include non-covalent linkages to a silica-containing moiety.

"Aligned," as used herein, means that the individual CNTs are organized along specific directions, e.g., normal to the substrate surface on which they are synthesized by means of chemical vapor deposition (CVD).

"Carbon nanotubes," or "CNTs," as used herein means graphitous elongated tubular structures consisting essentially of carbon, which have an average outer diameter of from about 1 nm to about 1 μm.

"Tensile strength," as used herein means the maximum tensile stress, and refers to the rupture stress per unit of cross-section area of a carbon nanotube fiber in micrometer size, subjected to a tensile load. Herein, tensile strength is expressed in units of GPa, or Giga-Pascals. The tensile strength of the fibrous composites was determined by means of a Shimadzu Universal Testing Instrument with a 5 N load cell, using the process described in X. Zhang et al., *Small*, vol. 3, pp. 244-248 (2007).

"Semiconductor" or "semiconducting," as used herein, means that the fibrous composite exhibits semiconductive-like characteristics such as temperature-dependent resistivity.

Figure 1:
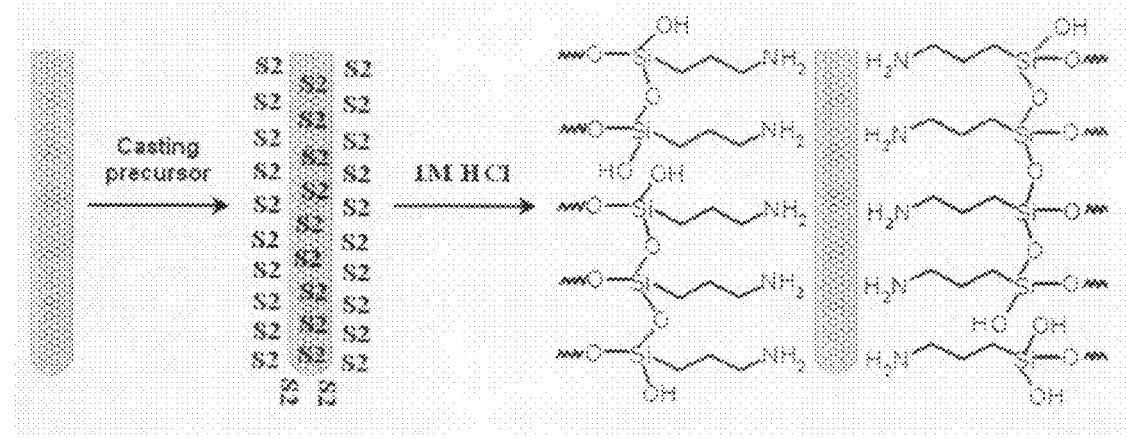
FIG. 1 is a schematic depiction of one non-limiting method of synthesizing fibrous composites (as termed herein, the "casting" method) wherein the steps include hydrolysis and condensation reactions, and the silica-containing moiety is essentially non-covalently bonded to the CNT. S2 is $(CH_3CH_2O)_3Si—(CH_2)_3—NH_2$.

The present invention describes fibrous composites comprising a plurality of CNTs which are modified by various silica-containing compounds. Two methods for modifying CNTs with silica-containing compounds are described. The first method is termed "casting," or "direct casting," (depicted in FIG. 1) and is performed by placing the carbon nanotubes in contact with a solution comprising a Si-containing precursor, spinning the CNTs into a fiber, and subsequently evaporating the solvents to form a composite. The CNTs may be made according to the method described in Li, Q. et al., *Advanced Materials*, vol. 18, pp. 3160-3163 (2006), with the only modification being that the starting material, or carbon source material, may be selected from methane (C1), ethylene (C2), any isomer of propylene (C3), any isomer of butylene (C4), or ethanol. Preferably, the starting material is methane or ethylene. In one embodiment, the starting material is ethylene.

The silica-containing precursors may be selected from the group consisting of $(CH_3(CH_2)_n—O)_3Si—(CH_2)_m—NR_1R_2$, where n is 0, 1, 2 or 3; m is from 1 to 6, and $R_1$ and $R_2$ are each independently H, $CH_3$, or $C_2H_5$; or $CH_3(CH_2)_n—O)_3Si—(CH_2)_m—NCO$, where n is 0, 1, 2 or 3; and m is from 1 to 6. In one embodiment, n is 1. In another embodiment, m is 2 or 3, and preferably is 3. In another embodiment, the silica-containing precursor is $(CH_3CH_2O)_3Si—(CH_2)_3—NR_1R_2$ where $R_1$ and $R_2$ are each independently H, $CH_3$, or $C_2H_5$, alternatively is $(CH_3CH_2O)_3Si—(CH_2)_3—NH_2$, and alternatively is $(CH_3CH_2O)_3—Si—(CH_2)_3—NCO$. Alternatively, the precursors may comprise $Si(OCH_3)_4$, $Si(OCH_3CH_2)_4$, and/or bridged silsesquioxanes having a structure $(RO)_3Si—R'—Si(OR)_3$, where R may be methyl or ethyl, and R' may be a C1-C6 alkane, a C1-C6 alkene, a C1-C6 alkyne, phenyl, or combinations thereof.

The method further comprises the steps of substantially evaporating the solvent from the composite, where "substantially" may be understood to mean that the solvent is 99% evaporated. One non-limiting example of a suitable solvent is tetrahydrofuran (THF); other suitable solvents would be apparent to one of skill in the art.

After evaporation of the solvent, the silica-containing precursor is non-covalently attached to the CNT to produce the fibrous composite. The precursor is then hydrolyzed under acidic conditions, which results in cleavage of the $CH_3(CH_2)_n$ group and formation of the OH group. The OH groups undergo condensation reaction with neighboring other OH groups to form cross-linkages. Therefore, the fibrous composite may comprise uncleaved $CH_3(CH_2)_n$ groups, Si—O—Si groups and/or Si—OH groups. It is also important to note that because the $CH_3(CH_2)_n$ is ultimately cleaved from the precursor, this substituent of the precursor may vary widely, and is not limited to those disclosed herein. A variety of alkanes, alkenes, phenyl, benzyl, etc. groups may be substituted, provided they do not adversely affect the casting method.

The casting method thus results in fibrous composites comprising silica-containing moieties having one of the following structures: $(SiO_3)Si$—$(CH_2)_n$—$NR_1R_2$, where n is from 1 to 6, and $R_1$ and $R_2$ are each independently H, $CH_3$, or $C_2H_5$; or $(SiO_3)Si$—$(CH_2)_m$—NCO, where m is from 1 to 6, wherein the silica-containing moiety is non-covalently attached, or bonded, to the CNT. In one embodiment, m is 3. In one embodiment, n is 2 or 3. In another embodiment, $R_1$ and $R_2$ are each H.

Figure 2:
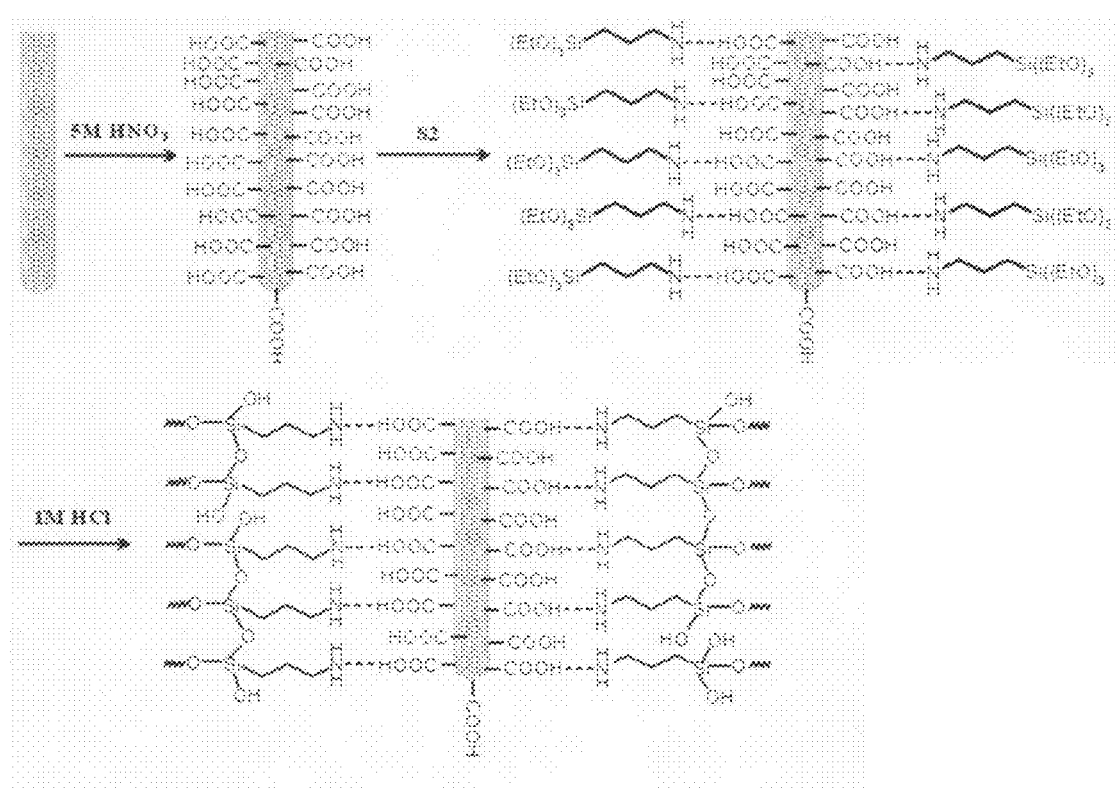
FIG. 2 is a schematic depiction of another non-limiting method of synthesizing fibrous composites, in which the CNT is carboxylated, and in which the silica-containing moieties are hydrogen bonded to the CNT. S2 is $(CH_3CH_2O)_3Si—(CH_2)_3—NH_2$.
Figure 3:
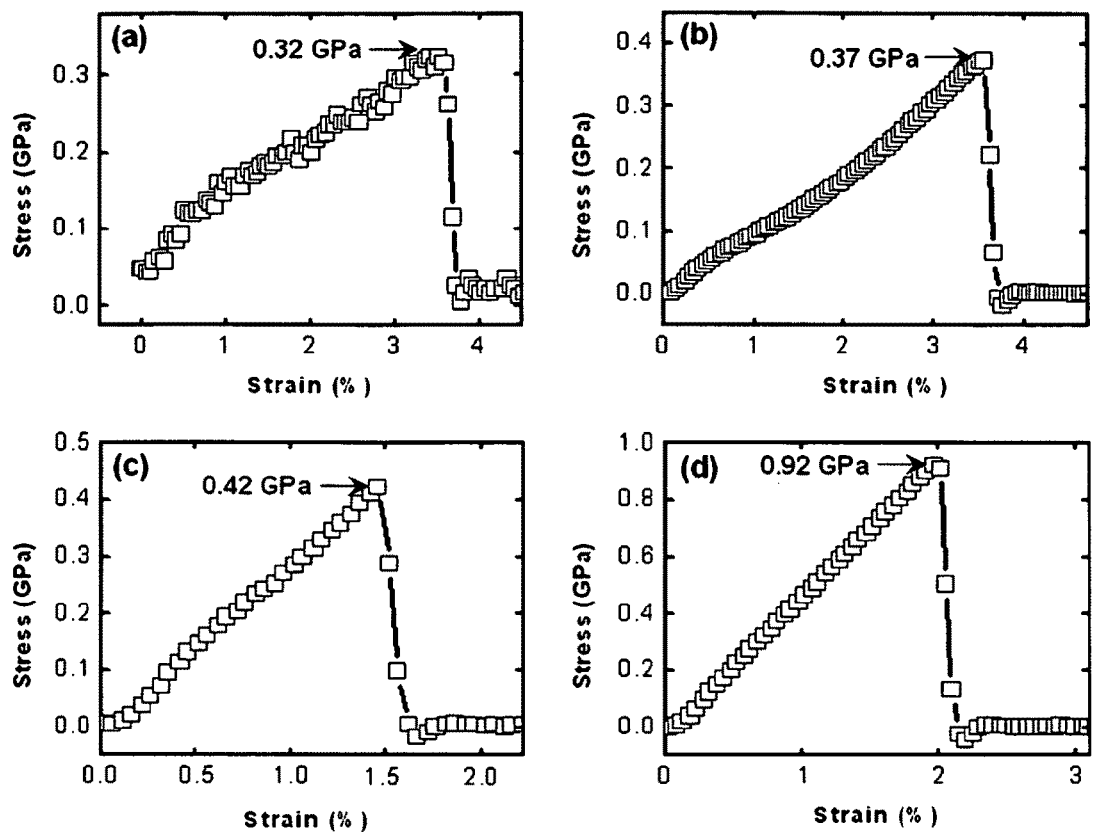
FIG. 3(a-d) depicts the mechanical strengths of various fibrous composites ("fibers") 10 of the present invention, where the y-axis is the tensile strength in GPa, or Giga-Pascals, and the x-axis represents the percentage of strain on a composite fiber.

The present invention further provides a second method for synthesizing the fibrous composites, herein termed "the carboxylation method," or "carboxylation." This method comprises the additional step of carboxylation of the CNTs prior to placing the CNTs in contact with the solution containing the silica-containing precursors, and is depicted in FIG. 2. Carboxylation, or addition of a COOH group to the outer surface of the CNT, may be achieved by treating the CNT with, for example, 5 M $HNO_3$ or other strong acid, as would be understood by one of skill in the art Upon exposure to the solution containing the silica-containing precursors, the precursors are attached to the CNTs by hydrogen bonding. As in the direct casting method, the attached precursors may then be hydrolyzed and undergo condensation reactions. When the carboxylation method is used, the precursor material is preferably $(SiO)_3Si$—$(CH_2)_n$—$NR_1R_2$, where $R_1$ and $R_2$ are each independently H, $CH_3$, or $C_2H_5$. Thus, the fibrous composites resulting from the carboxylation method may comprise $(SiO)_3Si$—$(CH_2)_n$—$NR_1R_2$—HOOC, where n is from 1 to 6 and $R_1$ and $R_2$ are each independently H, $CH_3$, or $C_2H_5$. In one embodiment, the fibrous composites comprise $(SiO)_3Si$—$(CH_2)_n$—$NH_2$ which is hydrogen bonded to the —COOH to form $(SiO)_3Si$—$(CH_2)_n$—$NH_2$—HOOC, where n is from 1 to 6.

The fibrous composites of the present invention may have an average diameter of from about 1 μm to about 20 μm, and alternatively from about 10 μm to about 15 μm. The fibrous composites may comprise from about 0.1% to about 10% by weight of silica, and alternatively from about 0.1% to about 5% by weight of silica.

The fibrous composites of the present invention have a tensile strength of at least 0.3 GPa, alternatively from about 0.3 GPa to about 5.0 GPa, alternatively from about 0.3 GPa to about 1.0 GPa, and alternatively from about 0.3 GPa to about 0.5 GPa. Applicants have found that higher tensile strengths may result from fibrous composites in which the silica-containing moiety is hydrogen bonded to the CNT, and when the CNT is produced from an S2 starting material.

The fibrous composites of the present invention may have a conductivity at room temperature of at least 100 S/cm, alternatively from about 100 S/cm to about 300 S/cm, alternatively from about 100 S/cm to about 200 S/cm, and alternatively from about 200 S/cm to about 300 S/cm. The fibrous composites may exhibit semiconducting behavior, as defined herein, and thus in one embodiment the fibrous composite is a semiconductor. The conductivity of the fibrous composites was measured as described in Li et al, Advanced Materials, vol. 19, pp. 3358-3363, the last paragraph of which on p. 3362 is incorporated herein by reference.

EXAMPLES

CNT fibers were spun from high-quality CNT arrays, which were synthesized by the chemical vapor deposition process described in Li, Q. et al., Adv. Mater. 2006, 18, pp. 3160-3163.

Synthesis of spinnable CNT arrays: CNT arrays were synthesized in a quartz tube furnace with a diameter of 2.54 cm. Ethylene served as the carbon source material, and Ar with 6% $H_2$ was used as the carrying gas. The catalysts used in this study were Fe (0.3-1.0 nm)/$Al_2O_3$ (10 nm) on $SiO_2$ (thickness of ~1 μm)/Si wafers. Fe and $Al_2O_3$ films were deposited by sputtering and ion-beam-assisted deposition techniques, respectively. CNT growth was typically carried out at 750° C. with 80-120 sccm ethylene and 80-120 sccm carrying gas for 15 min.

Fiber spinning: CNT fibers were spun from CNT arrays using a spindle with a microprobe at the top. A CNT ribbon was first pulled off from the substrate (or CNT arrays). The microprobe was then steered to touch the ribbon so that CNT fibers could be pulled out from the ribbon. The fiber diameter can be controlled by varying the initial ribbon width during the spinning. For easy spinning, silica nitride particles were first coated at the microprobe tip to increase the roughness. The microprobe with adjustable speeds was controlled by a motor. In order to control fiber diameters, the spinning was done under an optical microscopy.

Fabrication of composite fibers: Two different silica precursors were first dissolved in tetrahydrofuran with a concentration of 10 mg/mL. For the formation of composite fibers by direct casting, pure CNT fibers were dipped into the silica precursor solution, followed by evaporation of the solvent at room temperature. For the formation of composite fibers by chemical modification, CNT fibers were first treated with 5 M $HNO_3$ for about two days to produce COOH groups on the outer surface of CNTs. The resulting fibers were soaked in the silica precursor solution for about 1 day. Hydrolysis and condensation reactions were carried out in 1M HCl solution for three days. All operations were performed at room temperature. Additional experimental details can be found in C.-Y. Hong, Y.-Z. You, C.-Y. Pan, *Chemistry of Materials*, 2005, vol. 17, issue 9, 2247-2254, pages 2249-2250 of which are incorporated by reference.

Characterizations: Scanning electron microscopy (SEM) images, as well as energy-dispersive X-ray spectroscopy data, were obtained on a JEOL 6300FXV equipped with an Ametek V4.6 EDS system, at an accelerating voltage of 5 kV. The structure of CNTs was further characterized by transmission electron microscopy (TEM, Philips CM30 operated at 200 kV). Samples for TEM measurements were prepared by dropcasting CNT/ethanol solutions onto copper grids in the open air. The mechanical properties of the CNT fibers were characterized by a Shimadzu Table-Top Universal Testing Instrument. The CNT fibers were mounted on paper tabs with a gauge length of 5 mm. The fiber diameter was measured using a laser-diffraction method and further confirmed by SEM. The conductivities were measured using a four-probe method from 140 K to 310 K. For better electrical contact between the fiber and electrodes, a pre-patterned glass substrate with four Ag electrode stripes was made through a shadow mask. The fibers were then transferred onto the pre-patterned substrates. Finally, a thin layer of silver paste was cast on the fiber to stabilize them on the electrodes.

Whereas particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A fibrous composite comprising:
   a. a plurality of carbon nanotubes; and
   b. a silica-containing moiety having one of the structures:
      i. $(SiO)_3Si-(CH_2)_n-NR_1R_2$; or
      ii. $(SiO)_3Si-(CH_2)_n-NCO$);
   where n is from 1 to 6, and $R_1$ and $R_2$ are each independently H, $CH_3$, or $C_2H_5$.

2. The fibrous composite of claim 1, wherein the composite is a semiconductor.

3. The fibrous composite of claim 1, wherein the composite has an average diameter of from about 5 μm to about 20 μm.

4. The fibrous composite of claim 1, wherein the composite has a tensile strength of at least 0.3 GPa.

5. The fibrous composite of claim 1, wherein the composite has an electrical conductivity of at least 100 S/cm at room temperature.

6. The fibrous composite of claim 1, wherein composite has a weight percentage of silica of from about 0.1% to about 10%.

7. The fibrous composite of claim 1, wherein n is 3.

8. The fibrous composite of claim 1, wherein $R_1$ and $R_2$ are each H.

9. The fibrous composite of claim 1, wherein said carbon nanotube comprises a —COOH moiety which is hydrogen bonded to the silica-containing moiety to form $[(SiO)_3Si-(CH_2)_n-NR_1R_2]$—HOOC, where n is from 1 to 6, and $R_1$ and $R_2$ are each independently H, $CH_3$, or $C_2H_5$.

10. The fibrous composite of claim 8, wherein the carbon nanotube comprises a —COOH moiety which is hydrogen bonded to the silica-containing moiety to form $(SiO)_3Si-(CH_2)_n-NH_2$—HOOC, where n is from 1 to 6.

11. The fibrous composite of claim 9, wherein n=3.

12. The fibrous composite of claim 9, wherein the tensile strength is from about 0.3 GPa to about 5.0 GPa.

13. The fibrous composite of claim 10, wherein n=3.

14. The fibrous composite of claim 1, wherein the plurality of carbon nanotubes is substantially aligned.

15. A fibrous composite comprising:
   a. a plurality of carbon nanotubes; and
   b. a silica-containing compound having the structure

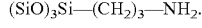
   $(SiO)_3Si-(CH_2)_3-NH_2$.

16. The fibrous composite of claim 15, wherein the carbon nanotube comprises a —COOH moiety which is hydrogen bonded to the silica-containing moiety to form $[(SiO)_3Si-(CH_2)_3-NH_2]$—HOOC.

17. The fibrous composite of claim 15, wherein the composite has a tensile strength of at least about 0.3 GPa.

18. The fibrous composite of claim 16, wherein the composite has a tensile strength of from about 0.3 GPa to about 5.0 GPa.

19. A fibrous composite comprising:
   a. a plurality of carbon nanotubes; and
   b. a silica-containing compound having the structure

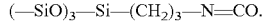
   $(-SiO)_3-Si-(CH_2)_3-N=CO$.

20. The fibrous composite of claim 19, wherein the composite has a tensile strength of from about 0.3 GPa to about 0.5 GPa.

* * * * *